United States Patent [19]
Hirshfield et al.

[11] Patent Number: 5,422,647
[45] Date of Patent: Jun. 6, 1995

[54] MOBILE COMMUNICATION SATELLITE PAYLOAD

[75] Inventors: Edward Hirshfield, Cupertino; Chich-Hsing A. Tsao, Saratoga, both of Calif.

[73] Assignee: Space Systems/Loral, Inc., Palo Alto, Calif.

[21] Appl. No.: 60,207

[22] Filed: May 7, 1993

[51] Int. Cl.⁶ ...................... H04B 7/185; H01Q 3/22
[52] U.S. Cl. .................................. 342/354; 342/353; 342/371; 342/373
[58] Field of Search ................ 342/353, 354, 371, 373

[56] References Cited

U.S. PATENT DOCUMENTS

| | | | |
|---|---|---|---|
| 4,503,436 | 3/1985 | Cramer, Jr. | 343/876 |
| 4,903,033 | 2/1990 | Tsao et al. | 343/700 |
| 4,931,802 | 6/1990 | Assal et al. | 342/373 |
| 4,947,176 | 8/1990 | Inatsune et al. | 342/173 |
| 5,166,690 | 11/1992 | Carlson et al. | 342/157 |
| 5,283,587 | 2/1994 | Hirshfield et al. | 342/372 |

FOREIGN PATENT DOCUMENTS

| | | |
|---|---|---|
| 17137/92 | 12/1992 | Australia . |
| 1226934 | 9/1987 | Canada . |
| 0253465 | 1/1988 | European Pat. Off. . |
| 0311919 | 4/1989 | European Pat. Off. . |
| 0405372 | 1/1991 | European Pat. Off. . |
| 0407243A1 | 1/1991 | European Pat. Off. . |
| 0516039 | 12/1992 | France . |
| WO88/08623 | 11/1988 | WIPO . |
| 91/086621 | 6/1991 | WIPO . |

OTHER PUBLICATIONS

FCC Application of Loral Cellular Systems, Corp. Jun. 3, 1991 pp. 94–187 GLOBALSTAR.
Patent Abstracts of Japan, vol. 9, No. 154 (E-325) 28 Jun. 1985 & JP-A-60 033 745 (Nippon Denshin Denwa Kosha) 21 Feb. 1985.
FCC Application of Ellipsat Corporation dated Nov. 2, 1990.

*Primary Examiner*—Gregory C. Issing
*Attorney, Agent, or Firm*—Perman & Green

[57] ABSTRACT

A communications satellite payload provides for efficient communications between user devices, such as hand held cellular telephones, and terrestrial gateways that may be connected to world-wide public telephone and telegraph (PTTs) networks. The satellite payload simultaneously supports a plurality of independent antenna beams, for example 12 or 16 beams, on both the uplink and downlink for user devices employing full duplex communications. The satellite payload furthermore supports an identical number of full duplex channels between a terrestrial gateway and the satellite. The communications satellite payload is carried by one satellite of a plurality of such satellites in a low earth orbit (LEO) constellation to provide worldwide communications. Downlink beam forming occurs prior to final amplification of transmitted signals, thereby reducing losses within the beam forming equipment. A multi-element phased array of receiving antennas and a multi-element phased array of transmitting antennas is also disclosed, wherein each element of each phased array is utilized for each individual one of a plurality of received or transmitted beams.

10 Claims, 8 Drawing Sheets

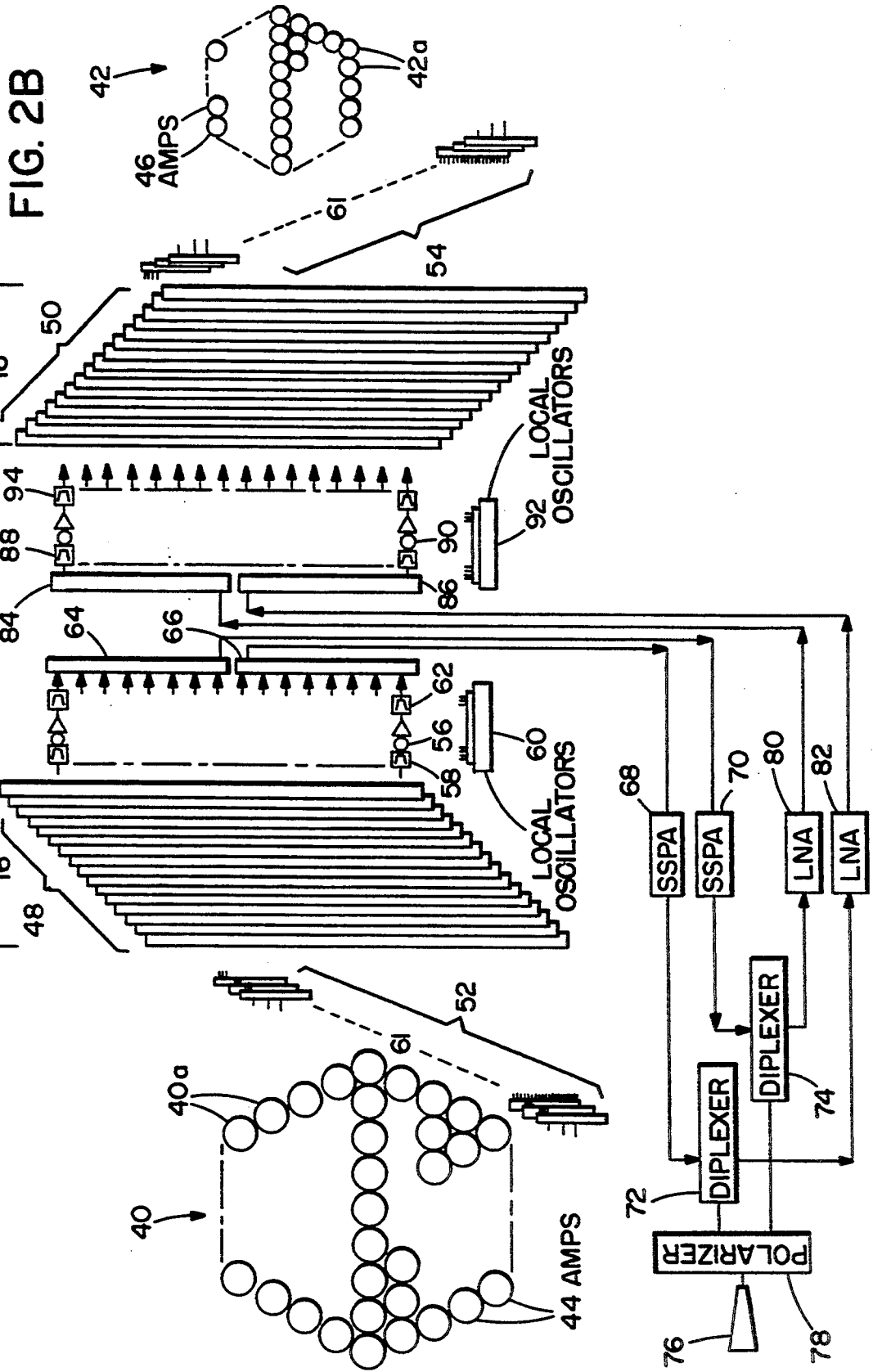

MOBILE COMMUNICATION SATELLITE PAYLOAD

FIELD OF THE INVENTION

This invention relates generally to communication systems and, in particular, to communication apparatus carried by a satellite platform.

BACKGROUND OF THE INVENTION

Important considerations when designing communication equipment for space-based platforms include the weight, complexity and power consumption of the equipment. A further consideration relates to minimizing losses in signals received from (uplink) and transmitted to (downlink) ground-based stations. By example, for conventional transmitters that employ a phased array of antennas, significant losses can occur within a beam forming system that is coupled between the outputs of power amplifiers and the inputs to the phased array of antennas.

SUMMARY OF THE INVENTION

It is thus an object of this invention to provide a satellite communication payload of reduced complexity and increased power consumption efficiency, relative to systems of the prior art.

It is another object of this invention to provide a satellite communication payload wherein beam forming occurs prior to final amplification of transmitted signals, thereby reducing losses within the beam forming equipment.

It is a further object of this invention to provide a satellite communication payload that employs a multi-element phased array of receiving antennas and a multi-element phased array of transmitting antennas, wherein each element of each phased array is utilized for each individual one of a plurality of received or transmitted beams.

It is another object of this invention to provide a satellite communication payload that employs a multi-element phased array receiving antenna and a multi-element phased array transmitting antenna, wherein available power is assigned to a particular downlink beam As a function of uplink power on a demand basis, without the need for command or control logic.

The foregoing and other problems are overcome and the objects of the invention are realized by a communications satellite payload that is constructed and operated in accordance with the teaching of the invention.

The teaching of this invention is directed to a communications satellite payload that provides for efficient communications between, by example, multiple hand held cellular telephones, or other radio-telephones, and terrestrial gateways that may be connected to worldwide public telephone and telegraph (PTTs) networks. The satellite payload of this invention simultaneously supports a plurality of independent antenna beams, for example 12 or 16 beams, on both the uplink and downlink from cellular telephones employing full duplex communications. The satellite payload furthermore supports an identical number of full duplex channels between a terrestrial gateway and the satellite. In a presently preferred embodiment of this invention, it is intended that the communications satellite payload be carried by one satellite of a plurality of such satellites in a low earth orbit (LEO) constellation to provide worldwide communications.

In accordance with this invention there is provided a satellite payload for use with a communication system. The payload includes a phased array receiving antenna having a plurality (n) of receive elements for receiving RF signals within a first band of frequencies. A plurality (m) of uplink beam formers each have an input coupled to each of the plurality of receive elements for forming m uplink beams from RF signals received by the phased array receiving antenna.

The payload includes ground station communication circuitry having an input coupled to an output of he uplink beam former and for converting m uplink beams into RF signals within a second band of frequencies. The ground station communication circuitry further includes circuitry and an antenna for transmitting RF signals to, and for receiving RF signals from, a ground station. The transmitted and received RF signals are within the second band of frequencies.

The payload further includes a downlink beam former having an input coupled to an output of the ground station communication circuitry for forming m downlink beams from the RF signals received from the ground station. The m downlink beams are formed within a third band of frequencies. A phased array transmitting antenna has a plurality of transmit elements for transmitting the m downlink beams as RF signals within the third band of frequencies. Each of the transmit elements has a power amplifier associated therewith, and each of the power amplifiers has an input coupled to an output of the downlink beam former and an output coupled to one of the transmit elements. Thus, downlink beam forming occurs before final amplification.

In the presently preferred embodiment, the first band of frequencies is within an L-band, the second band of frequencies is within a C-band, and the third band of frequencies is within an S-band.

In accordance with an embodiment of the invention each of the receive elements has a plurality of receive amplifiers coupled thereto, and an input of each of the receive amplifiers is coupled into free space at one of the receive elements. In like manner, an output of each of the power amplifiers is coupled into free space at one of the transmit elements of the transmit phased array antenna.

Further in accordance with the invention, each of the m uplink beams has a corresponding downlink beam that illuminates a same region from which the uplink beam originates, and a power level of the corresponding one of the downlink beams is a function of a power level of the uplink beam.

In a further embodiment of the invention the receiver and transmitter phased array antennas are each fabricated using multi-layer circuit technology, and the receive and transmit elements are each an electrically conductive patch that is provided on a surface of a multi-layered printed circuit board. A two cavity filter is electrically coupled to each of the patches, the filters being formed within underlying layers of the multi-layered printed circuit board.

BRIEF DESCRIPTION OF THE DRAWINGS

The above set forth and other features of the invention are made more apparent in the ensuing Detailed Description of the Invention, when read in conjunction with the attached Drawings, wherein:

FIG. 2b is a block diagram of the mobile satellite communication payload of FIG. 2a that is constructed and operated in accordance with the teaching of this invention;

FIG. 3a is a side view of one of the transmit phased array elements, FIG. 3b is a top view, and FIG. 3c is a schematic depicting the use of four amplifiers that are spaced at 90° from one another;

FIG. 6b is a block diagram of a beam forming network that is constructed from a plurality of the power combiner/dividers of FIG. 6a;

DETAILED DESCRIPTION OF THE INVENTION

Figure 1:
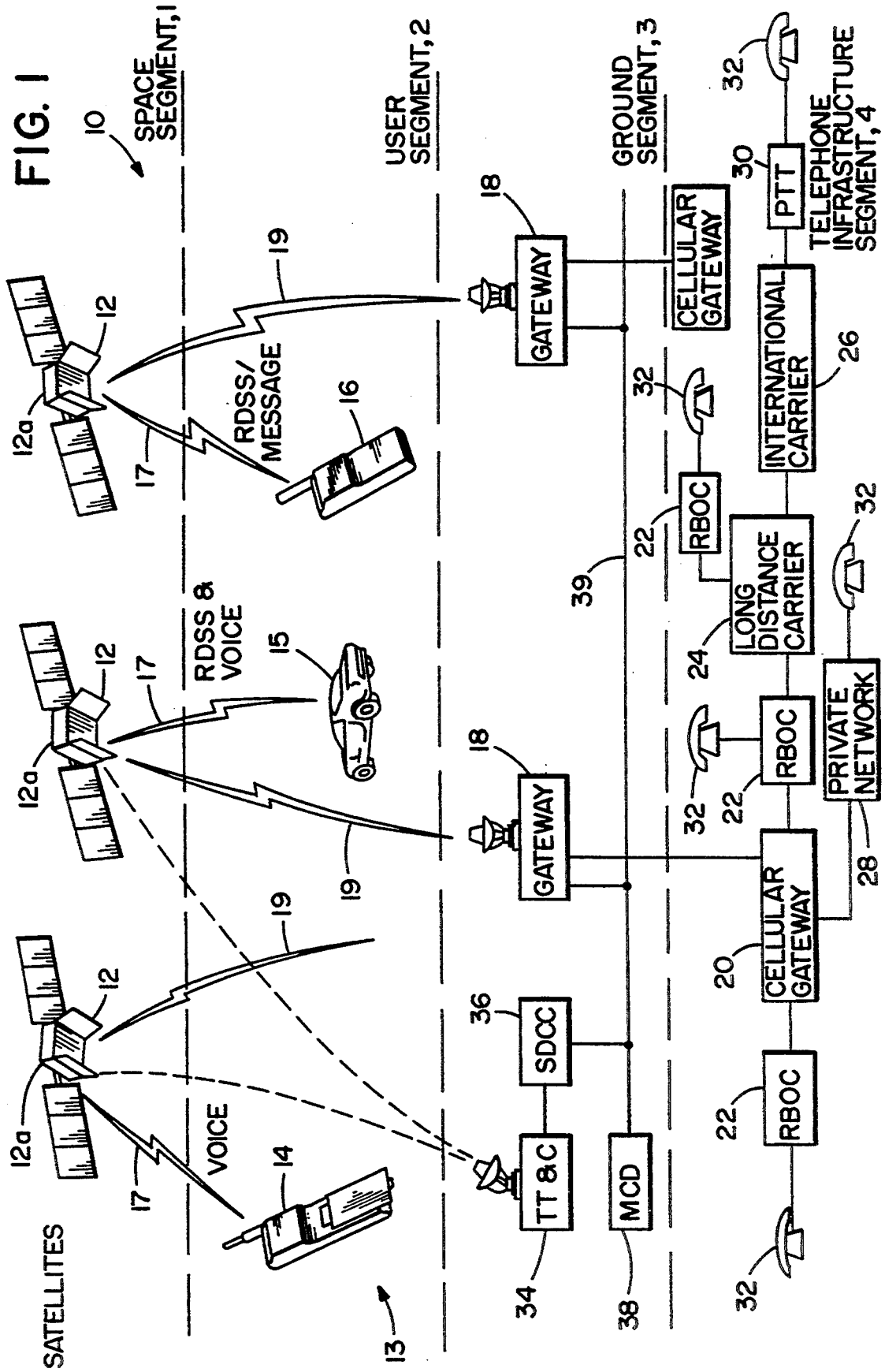
FIG. 1 depicts a communication system of a type that employs the teaching of this invention.

FIG. 1 illustrates an exemplary environment within which the communication satellite payload of this invention is intended to operate. A communications system 10 may be conceptually sub-divided into a plurality of segments 1, 2, 3 and 4. Segment 1 is referred to herein as a space segment, segment 2 as a user segment, segment 3 as a ground (terrestrial) segment, and segment 4 as a telephone system infrastructure segment. This invention is most specifically directed to the space segment 1 and, in particular, to the communications payload 12 that is carried by individual ones of a constellation of low earth orbiting satellites 12a.

The user segment 2 includes a plurality of types of user equipment that is adapted for communication with the satellites 12. This user equipment includes, by example, a plurality of different types of user devices 13 including, but not limited to, radio-telephones 14, mobile radio-telephones 15, and paging/messaging-type devices 16. The user devices 13 may be capable of operating in a full duplex mode and communicate via L-band RF links (uplink) and S-band RF links (downlink) with the satellite payloads 12a. Uplink L-band RF links operate within a frequency range of 1.61 GHz to 1.6265 GHz, bandwidth 16.5 MHz, and are modulated with voice signals and/or radio determined satellite service (RDSS) signals in accordance with a spread spectrum technique. Downlink S-band RF links operate within a frequency range of 2.4835 GHz to 2.5 GHz, bandwidth 16.5 MHz. The uplink and downlink RF links 17 are modulated with voice signals and/or radio determined satellite service (RDSS) signals in accordance with a spread spectrum technique.

The ground segment 3 includes a plurality of gateways 18 that communicate with the satellites 12a via a full duplex C-band RF link 19 that operates within a range of frequencies centered on 5 GHz. The gateways 18 function to couple the communications payload 12a of the satellites 12 to the telephone infrastructure segment 4. The telephone infrastructure segment 4 is comprised of existing telephone systems and includes cellular gateways 20, Regional Bell Operating Centers (RBOC) 22, long distance carriers 24, international carriers 26, private networks 28 and public telephone and telegraph systems 30. The communication system 10 operates to provide communication between the user segment 2 and the telephones 32 of the telephone infrastructure segment 4, and also operates to enable communication between individual ones of the user devices of the user segment 2, via the gateways 18.

Also shown in FIG. 1, as a portion of the ground segment 3, is a telemetry control system 34 that includes a satellite operation control center (SOCC) 36 and a network control center (NCC) 38. A communication path 39 is provided for interconnecting the gateways 18, SOCC 36 and NCC 38 of the ground segment 3. This portion of the communications system 10 provides satellite control functions and is not directly pertinent to the operation of the communications payload 12 of this invention.

Figure 2A:
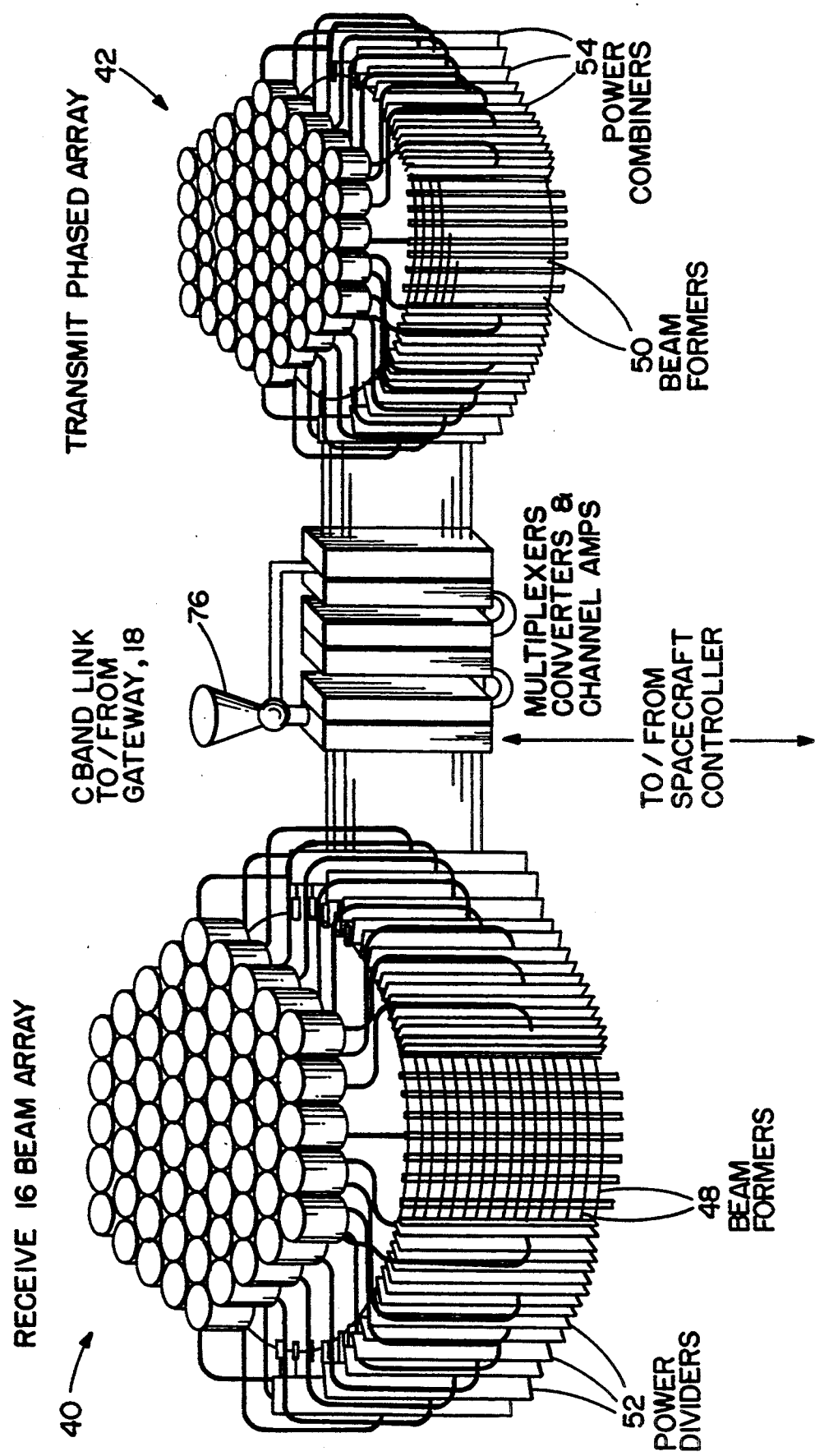
FIG. 2a illustrates the major functional components of a satellite communication payload of this invention.

FIGS. 2a and 2b are block diagrams of one of the satellite payloads 12 of FIG. 1. The satellite payload 12 is comprised of the following major components.

An L-band receive antenna 40 and an S-band transmit antenna 42 couple the uplink and the downlink, respectively, to the user devices of the user segment 2. Antennas 40 and 42 are each a phased array comprised of, by example, 61 elements (40a, 42a) each. The elements are packed into a generally hexagonal configuration. By example, the maximum width of the receive antenna 40 is approximately 40 inches and the maximum width of the transmit antenna 42 is approximately 25 inches. Each element 40a has a diameter of approximately 4.4 inches and each element 42a has a diameter of approximately 2.7 inches. Each antenna 40 and 42 operates with a same number of beams, for example 12 or 16, and uses every one of the 61 elements for every one of the beams. FIG. 4 illustrates an exemplary 12 beam antenna coverage configuration, wherein the unillustrated lower portion is the mirror image of the illustrated upper portion. The use of 12 beams provides for an approximately 110° coverage region (10° elevation). Approximately 200 of the user devices of the user segment 2 can be serviced by a single one of the beams, resulting in approximately 2400 user devices being serviced with a 12 beam configuration and approximately 3600 user devices being serviced with a 16 beam configuration. To accommodate this number of user devices, the payload 12 employs frequency re-use with CDMA (code division multiple access) to provide 13 sub-bands each with a bandwidth of 1.25 MHz.

Directly coupled to the 61 elements 40a of the receive antenna 40 are low noise amplifiers (LNAs) 44 for receipt of the L-band uplink signals. Directly coupled to the 61 elements 42a of the transmit antenna 42 are high power amplifiers (HPAs) 46 for transmitting the S-band downlink signals. The HPAs 46 are capable of transmitting with several different power levels. The LNAs 44 and the HPAs 46 are designed to operate in a linear region wherein the output signal is directly proportional to the input signal. Linear operation preserves the fidelity of the signals transmitted, and also provides the ability for every antenna element to carry multiple independent beams simultaneously.

As the satellite 12a passes over a group of user devices, the access to the satellite 12a moves from beam to beam in a direction opposite to that of the satellite motion. Thus, the need for transmission power for the S-band downlink from the satellite 12a must also move from beam to beam in a corresponding manner.

In accordance with an aspect of this invention, the payload 12 provides for the available power to be assigned to a particular downlink beam that is illuminating the same ground area as the uplink beam in use. This occurs because the downlink HPAs 46 are associated with each of the downlink feed elements 42a, and thus each element 42a participates in every beam. The power is therefore assigned on a demand basis, automatically in cooperation with the gateways 18, and without the need for command or logic control.

In greater detail, the phased array antennas 40 and 42 are formed by multiple beam forming networks 48 and 50, respectively, which establish the direction that each beam points relative to the satellite 12a. In the illustrated embodiment there are 16 uplink and downlink beams, and thus 16 uplink beam formers 48 and 16 downlink beam formers 50. To generate 16 simultaneous uplink beams the outputs of each receive antenna element 40a are divided, after amplification by the LNAs 44, into 16 paths that are fed to the beam formers 48, thereby establishing the direction and shape of each uplink beam. The same is true of the downlink beams, wherein 16 inputs are combined and then amplified by the HPAs 46 for transmission. The segmentation into multiple paths is accomplished by an uplink power divider 52 and downlink power combiner or summer 54.

There are 61 uplink power dividers 52. Each uplink power divider 52 has an input coupled to an output of one of the LNAs 44 and 16 outputs, individual ones of which are coupled to one of the 16 beam formers 48. In like manner, there are 61 downlink power combiners 54. Each downlink power summer 54 has 16 inputs coupled to an output of one of the 16 beam formers 50, and an output coupled to one of the HPAs 46.

Figure 6A:
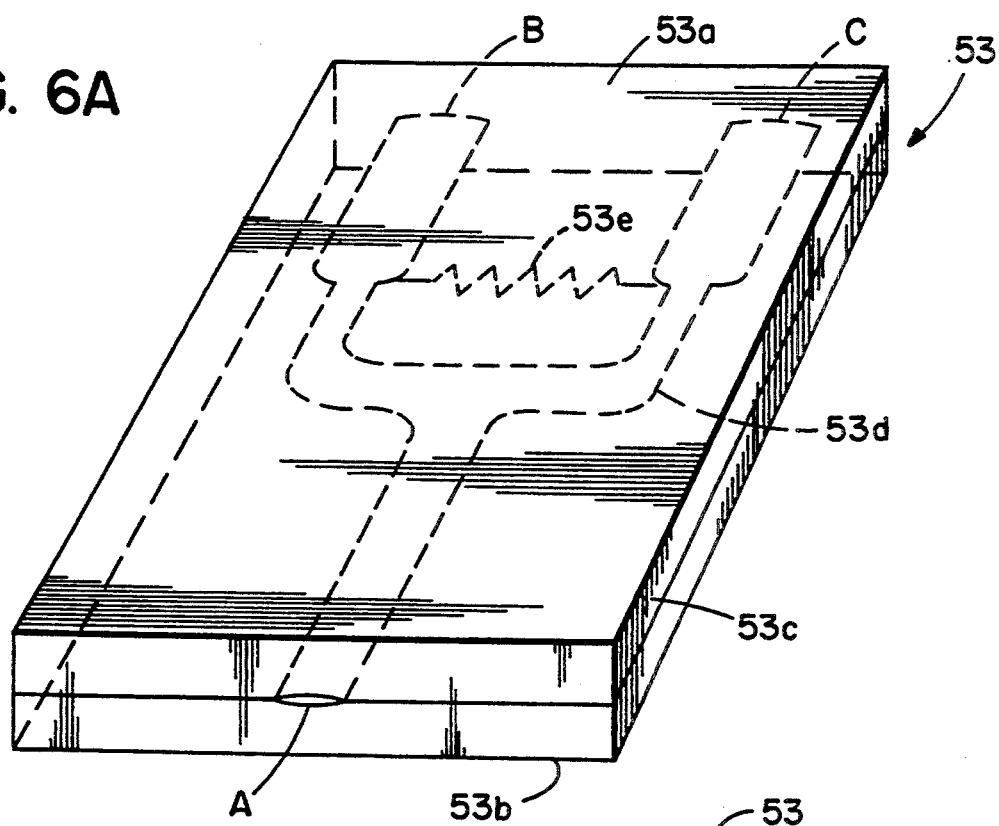
FIG. 6a is a top elevational view showing an exemplary embodiment of a 2-way power combiner/divider.

FIG. 6 illustrates an exemplary 2-way power divider/combiner 53. The power combiner/divider 53 includes a first ground plane 53a, a second ground plane 53b, and a region comprised of dielectric material 53c that is interposed between the first and second ground planes 53a and 53b. An electrically conductive circuit 53d is also contained within dielectric material 53c, and includes an isolation resistor 53e. When dividing power, the input signal is applied to port labeled A and is extracted from the ports labeled B and C. When combining powers, the inputs signals to be combined are applied to the ports B and C, and the summation of the two signals is extracted from the port A. The dimensions and thicknesses of these various elements is a function of the frequency of interest and the dielectric constant of the material 53C. A 16-way or 61-way power divider/combiner is constructed in a similar fashion, or can be implemented by cascading a plurality of the 2-way divider combiners 53.

Figure 6B:
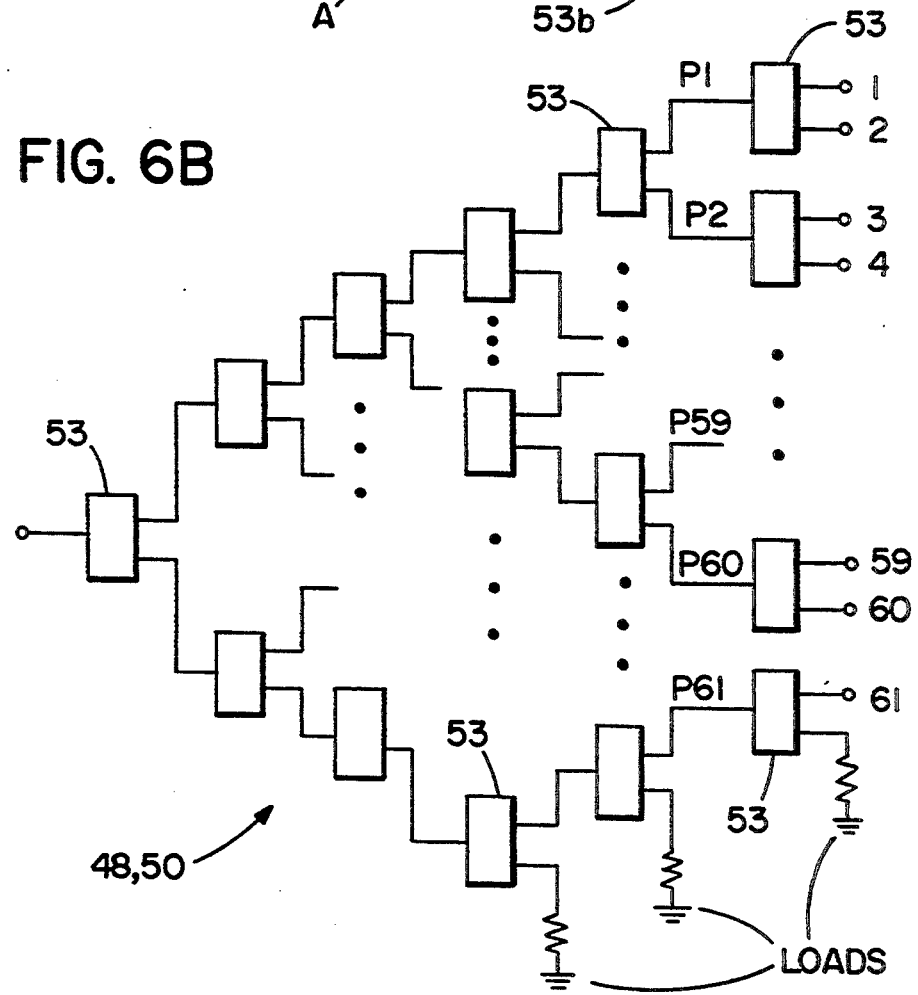

By example, FIG. 6b illustrates one of the beam forming networks (48, 50) that is constructed by cascading together six levels of the power combiner/dividers 53. P1, P2, ..., P61 represent different path lengths to yield a different phase at each antenna element. Unused ports of the power combiner/dividers 53 are preferably terminated with suitable loads.

As was described above, the communication system 10 employs the gateways 18 to receive the signals collected by the satellite(s) 12a and transport the signals into associated PTT networks. The gateways 18 also receive signals from the PTT networks to be transmitted back, via the satellite payloads 12, to the user devices. Transmission between the gateways 18 and the satellites 12a is via the C-band RF links 19.

To accommodate this mode of operation, the L-band signals received by the 16 beams are frequency division multiplexed (FDM) for transmission over the C-band of frequencies. Referring again to FIG. 2b, this is accomplished by a plurality (16) of amplifier mixers 56 which operate to up convert the L-band signals to C-band signals. The frequencies of each of the FDM channels are established by local oscillators 60, in conjunction with amplifier mixers 56, and filters 62. Multiple (8) channels are combined in individual ones of summing networks 64 and 66 and provided to power amplifiers (SSPAs) 68 and 70, respectively. The outputs of power amplifiers 68 and 70 are applied, via diplexers 72 and 74, to orthogonal channels for transmission to the gateways 18 from antenna 76. The orthogonal channels are established by a polarizer 78.

Circularly polarized orthogonal signals back from the gateways 18 arrive through antenna 76 and are separated by polarizer 78. Uplink and downlink signals from the gateways 18 are at different frequency bands and are separated by the diplexers 72 and 74. The uplink gateway signals are amplified by low noise amplifiers LNAs 80 and 82 and are provided to power dividers 84 and 86, respectively. The outputs of the power dividers 84 and 86 are provided to 16 filters 88 and amplifier mixers 90 which, in conjunction with local oscillators 92, down convert the C-band gateway transmissions to establish the S-band return channels to beam forming networks 50. The outputs of the amplifier mixers 90 are coupled to the beam forming networks 50 through filters 94.

The gain necessary to drive the beam forming networks 50 is established by the LNAs 80 and 82 and by the amplifier mixers 90. Signals from the beam forming networks 50 are collected in the n-way (n=16 in the example) power summers 54 and provided to the individual elements 42a of the transmit phased array antenna 42.

As described above, the teaching of this invention provides an efficient means for applying payload power where it is required, without the need for a control system or unwanted time delays. That is, through the use of linear amplifiers and the use of all of the elements of each phased array antenna for each of the 16 beams, the signal power of each of the L-band uplink beams is preserved through the receiver circuitry, the C-band up conversion, the S-band down conversion, and through final amplification to the transmit phased array antenna 42. As such, the signal power of each of the S-band downlink beams is a function of the signal power of the corresponding L-band uplink beam. The signal power of an L-band uplink beam is a function of the number of user devices that are serviced by the beam.

In general, the beam forming networks 48 and 50 incorporate both amplitude and phase variations in beam forming. The preferred implementation for the beam forming networks in this invention, however, employs phase-only beam forming. This allows each antenna element and the associated amplifiers to be excited equally. This is important in preserving the phase relationships between the antenna elements, in that the phase transfer characteristics of the amplifiers can change as a function of drive level. By driving all amplifiers at the same level, this potential problem is avoided.

Furthermore, by employing the beam forming networks 50 for the transmit phased array antenna 42 in the signal path before the power consuming high power amplifiers 46, the losses associated with the beam forming process are substantially reduced over conventional techniques.

Beam forming before amplification requires that the final amplifiers 46 at all of the elements 42a replicate one another in both amplitude and phase transfer characteristics with high precision (within ±2° and ±0.5 dB). Preferably, this is achieved through the use of monolithic microwave integrated circuits (MMICs) for the HPAs 46, in that MMICs provide very repeatable performance from amplifier to amplifier.

Reference is now made to FIGS. 3a, 3b, 3c and 3d for showing a further aspect of this invention. This aspect of the invention relates to the manner in which the LNAs 44 are installed in the receive antenna elements 40a, and also to the manner in which the HPAs 46 are installed in the transmit phased array elements 42a. The inputs of the LNAs 44 and the outputs of the HPAs 46 couple directly into free space. As a result, virtually no loss is incurred in intervening cables, waveguide or other microwave components.

Figure 3A:
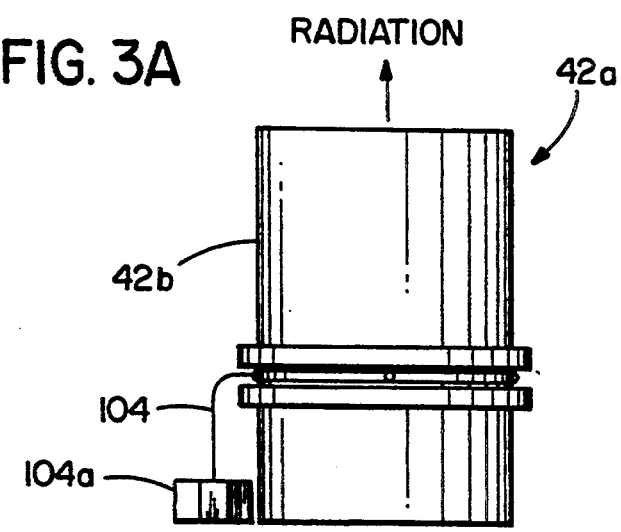
FIGS. 3a–3c show in greater detail one of the radiators of the transmit phased array of FIG. 2, specifically
Figure 3B:
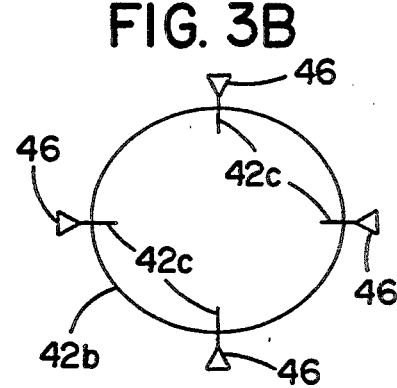
Figure 3D:
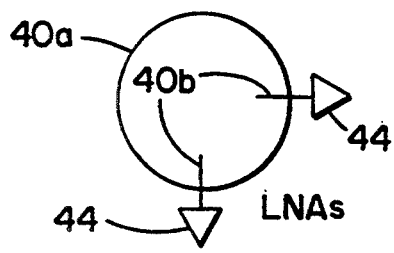
FIG. 3d is a top view of a single element of the phased array receiving antenna showing the use of two receive amplifiers.
Figure 3C:
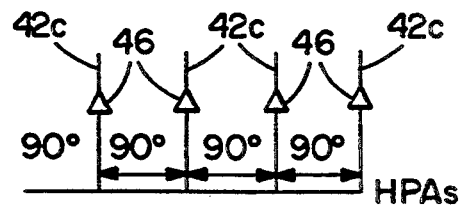
Figure 5:
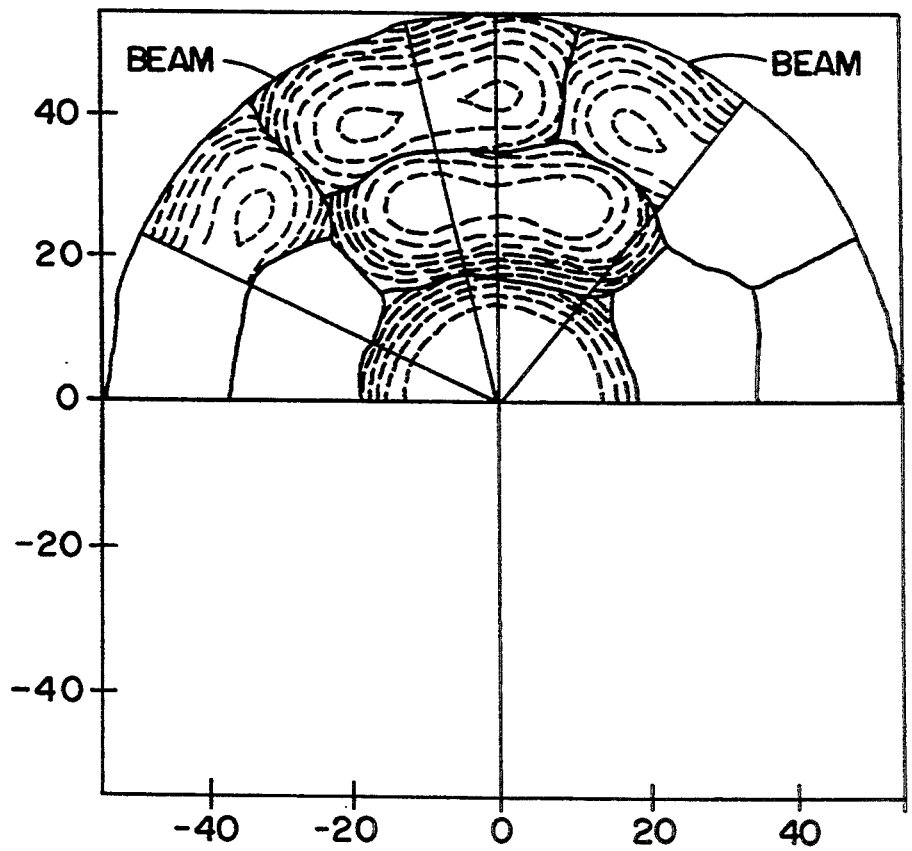
FIG. 5 depicts a 12-beam phased array antenna coverage profile.

FIG. 3a is a side view of one of the transmit phased array elements 42a, FIG. 3b is a top view, and FIG. 3c is a schematic depicting the use of four HPAs 46 that are spaced at 90° from one another. An individual radiator element 42a is formed by a cylindrical structure 42b dimensioned to support propagation along its vertical axis. The structure 42b forms a short circular waveguide at the operating frequency. The HPAs 46s can be positioned at up to 4 positions at 90° phase increments around the circumference of the structure 42b to excite the desired circularly polarized wave. For the case of the transmit phased array antenna 42, two or four probes 42c and associated HPAs 46 are required, depending upon the size of the power amplifiers and the amount of power required.

As seen in FIG. 3d, and for the case of the receive elements 40a, two probes 40b at 90° phase offset and quadrature spacing are provided for receiving the circularly polarized signal.

The physical construction of the phased array antennas 40 and 42 is an important factor in the effectiveness of the payload 12, in that minimizing weight and total d.c. power consumption has a large impact on cost. A presently preferred construction approach is illustrated in FIGS. 4a and 4b.

Figure 4B:
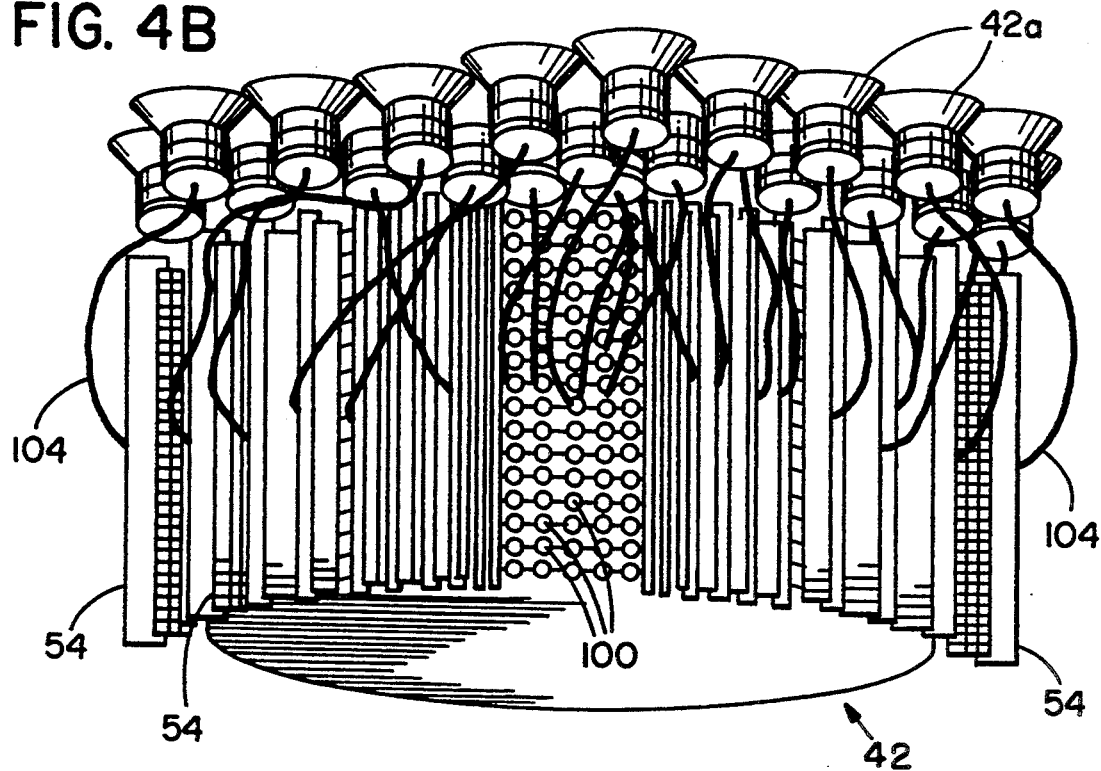
FIGS. 4a and 4b illustrate in greater detail the overall construction of the transmit phased array of FIG. 2.
Figure 4A:
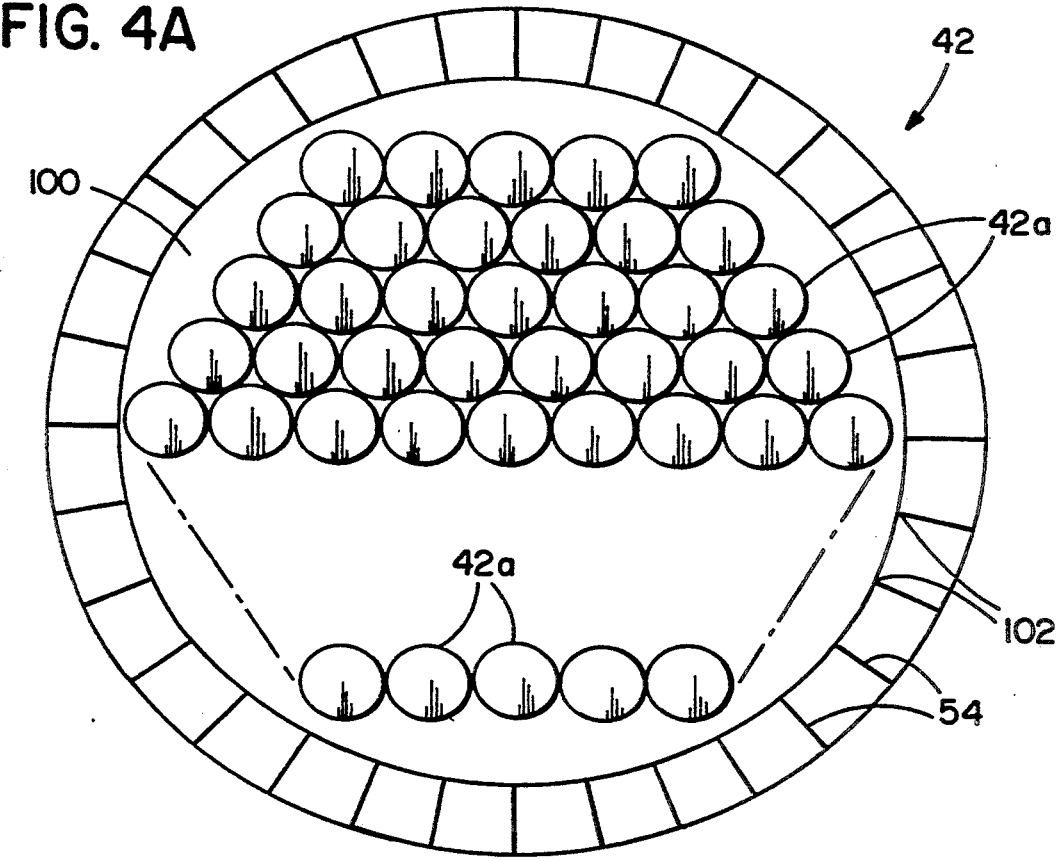

FIG. 4a is a top view looking into the 61 element feed array 42 and FIG. 4b is an elevational view. The elements 42a are placed above beam forming network multi-layer boards 100 which are embodied as tri-plate discs. There are 16 beam forming network multi-layer boards 100, stacked one above another, that implement the beam formers 50 of FIG. 2. Each beam forming network board 100 has 61 outputs 102 which extend radially outward. The corresponding output 102 from each of the 16 beam forming network boards 100 are summed in the 16-way power combiners 54. The summed output of each of the power combiners 54 are connected to the 61 elements 42a by coaxial cables 104 and associated connectors 104a. Each of the elements 42a include the four HPAs 46 shown in FIGS. 3a–3c.

Figure 7:
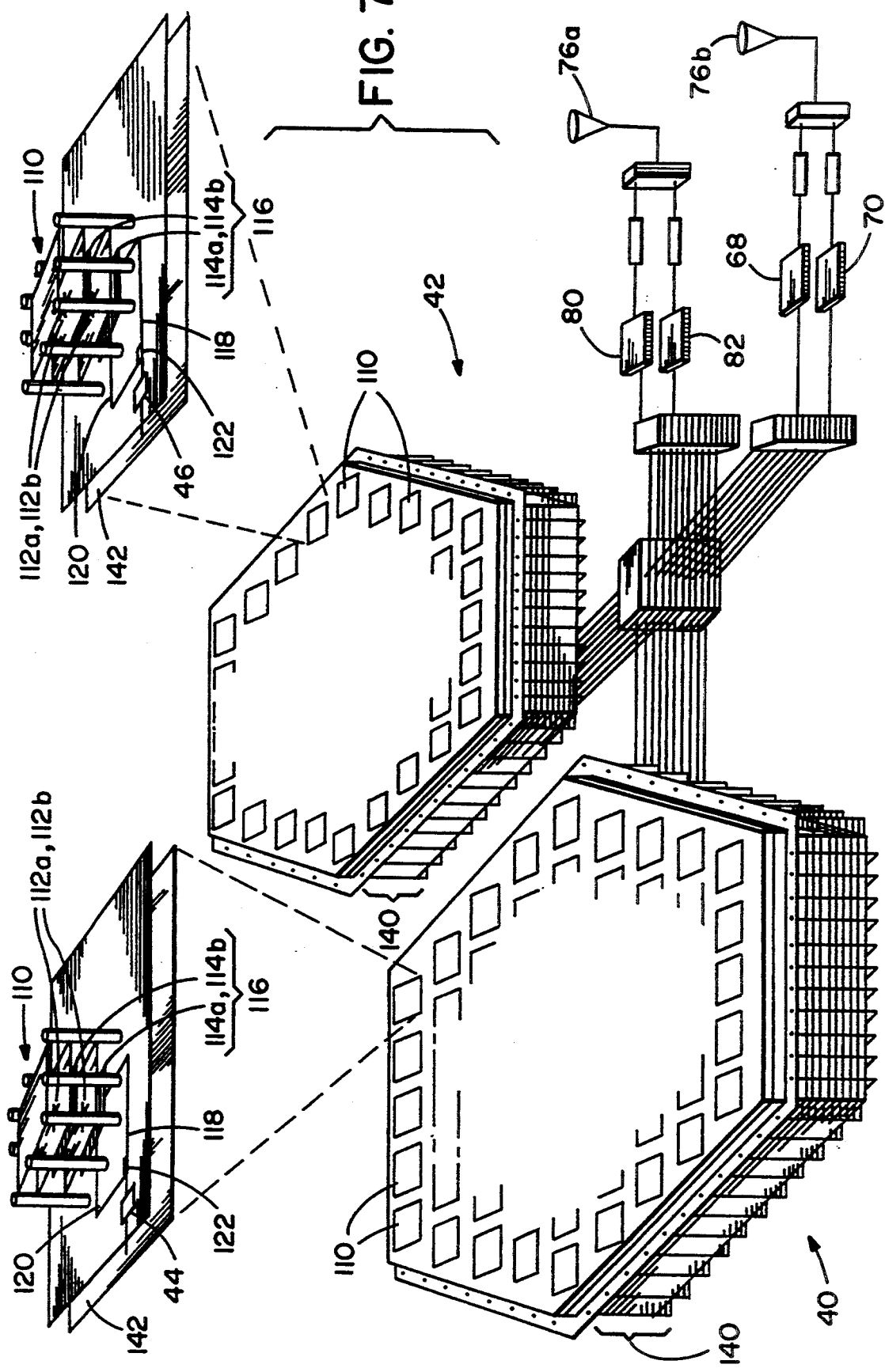
FIG. 7 depicts an embodiment of the invention that employs radiating patches for the receive and transmit phased array antennas.

An alternate embodiment for implementing the array elements of antennas 40 and 42 is shown in FIG. 7. In this embodiment the radiating element is comprised of a conducting patch 110 which is coupled to a resonator 114a through an iris 112a. In like manner resonator 114a is coupled to a resonator 114b through an iris 112b. Resonators 114a and 114b form a two pole bandpass filter 116. Energy is coupled to or extracted from the filter 116 by conducting paths 118 and 120 in quadrature. When these two paths are combined in a 90° hybrid coupler 122, a circularly polarized wave front is launched/received by the patch radiator 110. In this case each element can be fed with one LNA/HPA. Alternately, this structure can be fed in a similar manner described previously with two or four LNAs/HPAs to generate circularly polarized radiation. An advantage of this embodiment of the invention is that it can be formed with multi-layer printed circuit technology, although the dielectric material may be more lossy than the free space in the cavity/horn approach described previously. The printed circuit approach is, however, less costly to manufacture.

It is noted in FIG. 7 that two C-band horns 76a and 76b are employed, and the diplexers 72 and 74 (FIG. 2b) are eliminated.

Representative dimensions of the patches 110 of the receiving phased array antenna 40 sets the center-to-center distance between adjacent patches 110 at 4.5 inches, while for the transmitting phased array antenna 42 the center-to-center distance between adjacent patches is three inches.

Figure 9:
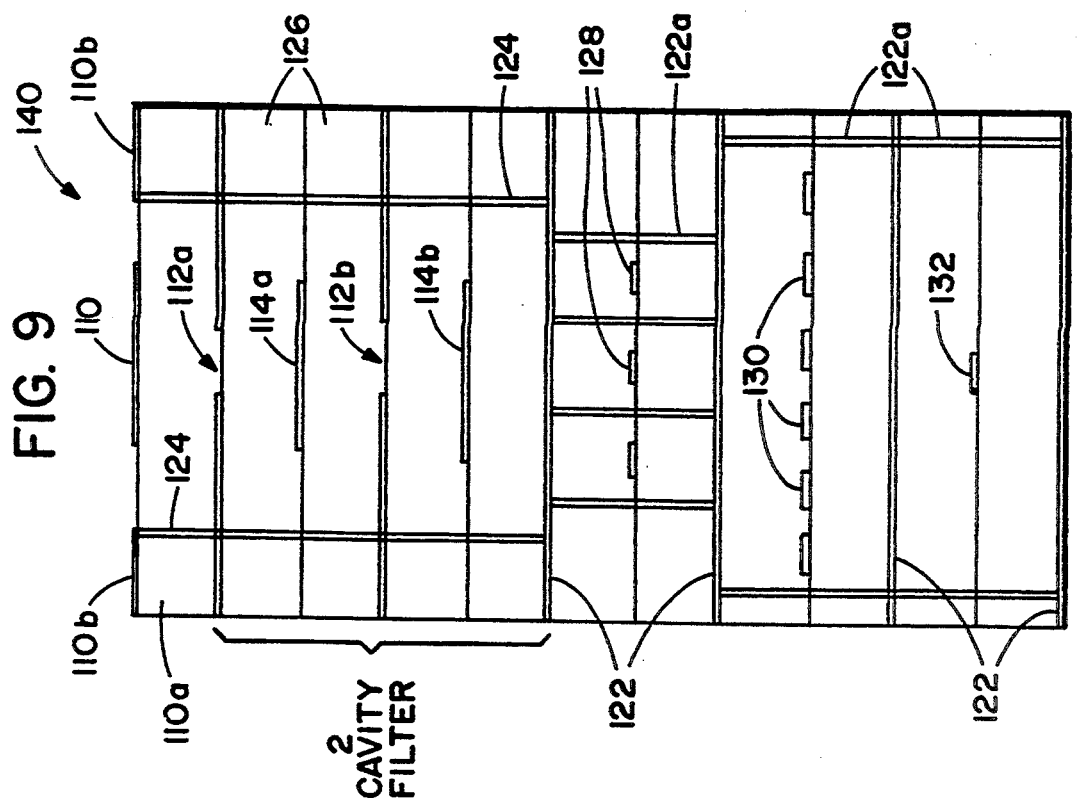
FIG. 9 is a cross-sectional view of the multi-layered circuit embodiment that illustrates the radiating patch and 2 cavity filter of FIG. 8, and also additional layers that provide connections to associated support circuitry.
Figure 8:
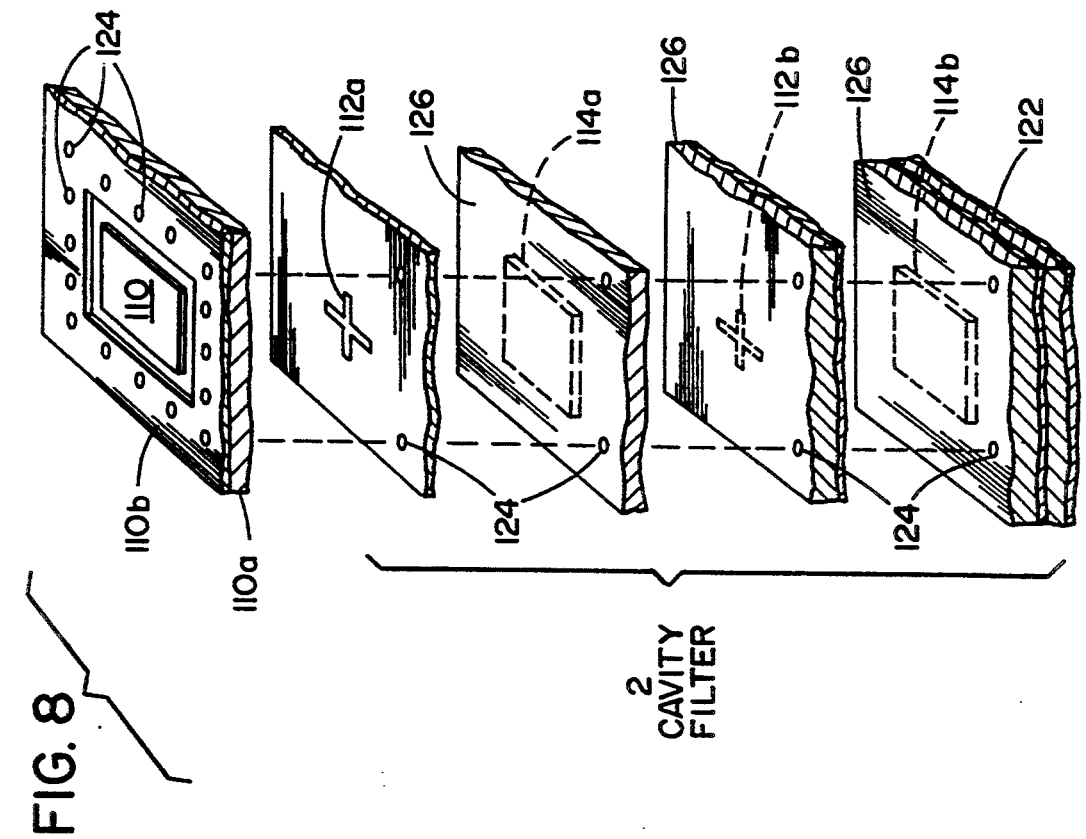
FIG. 8 is an elevation, exploded view of a portion of a multi-layered circuit embodiment of a radiating patch of FIG. 7, and particularly shows the radiating patch and an associated 2 cavity filter.

Reference is now made to FIGS. 8 and 9 which illustrate in greater detail the construction details of one of the multi-layered radiating patch elements. In FIG. 8 the patch 110 is formed on a surface of a dielectric material 110a and is surrounded by a conductive isolation plane 110b. The patch 110 and isolation plane 110b are comprised of, by example, ½ ounce copper. Underlying the patch 110 is a solid copper plane having an etched opening for defining the iris 112a. The copper plane within which the iris 112a is etched may be the opposite side of the printed circuit layer containing the dielectric 110a and patch 110. Underlying the iris 112a is a single sided circuit board comprised of dielectric material 126 that has an etched copper square for forming the filter 114a. The etched copper square is on the bottom side of the single sided circuit board. The second iris 112b is provided on a single sided circuit board and is also etched within a copper plane. The filter 114b is an etched copper square on the bottom side of a printed circuit board having dielectric material 126. A solid copper ground plane 122 underlies the filter 114b. The iris' 112a, 112b and filters 114a, 114b form a two cavity filter for the associated patch 110. Plated through holes 124 pass through all of these layers from the isolation plane 110b to the ground plane 122.

FIG. 9 is a cross-sectional view that shows the patch 110 and 2 cavity filter of FIG. 8 disposed above further layers that provide connections to MMIC amplifiers (MMIC LNA for the receiver phased array 40 and MMIC SSPA for the transmitter phased array 42). An additional six layers provide three further ground planes 122 with associated plated through feedthroughs 122a that pass through the six layers. One of the layers contains MMIC power traces 128, one of the layers contains MMIC control lines 130, and one of the layers contains a power divider 132, which is the output of the MMIC. The complete multi-layered circuit board 140, including the required layers of bonding adhesive, has a total thickness of approximately 0.3 inches. In a preferred embodiment of the invention a single multi-layered circuit board 140 is constructed so as to contain all 61 of the patches 110, associated 2 cavity filters, support circuitry, and signal and power routing.

A thermal layer 142 (shown in FIG. 7) is disposed beneath the multi-layered circuit board 140 for conducting away heat that is generated by the MMICs. The thermal layer 142 may contain heat pipes and/or other suitable thermal conduction elements.

The invention has been described above with respect to a presently preferred embodiments thereof. It should be realized, however, that the numbers of transmitting and receiving elements, the number of uplink and downlink beams, and the various frequency ranges are not intended to be read in a limiting sense upon the practice of the invention.

Thus, while the invention has been particularly shown and described with respect to preferred embodiments thereof, it will be understood by those skilled in the art that changes in form and details may be made therein without departing from the scope and spirit of the invention.

What is claimed is:

1. A satellite payload for use with a communication system, the payload comprising:
   a phased array receiving antenna having n receive elements for receiving RF signals within a first band of frequencies;
   first beam forming means having an input coupled to each of said n receive elements for forming m uplink beams from RF signals received by said phased array receiving antenna, wherein n is greater than one, and wherein m is less than n;
   ground station communication means, having an input coupled an output of said first beam forming means, for converting said m uplink beams into RF signals within a second band of frequencies and for transmitting RF signals to and for receiving RF signals from a ground station, the transmitted and received RF signals being within said second band of frequencies;
   second beam forming means having an input coupled to an output of said ground station communication means for forming m downlink beams from the RF signals received from said ground station, said m downlink beams being formed within a third band of frequencies; and
   a phased array transmitting antenna having n transmit elements for transmitting said m downlink beams as RF signals within said third band of frequencies, each of said transmit elements having a power amplifier means associated therewith, each of said power amplifier means having an input coupled to an output of said second beam forming means and an output coupled to one of said transmit elements, wherein each of said n transmit elements transmits RF energy for each of said m downlink beams,
   wherein each of said m uplink beams has a corresponding downlink beam that illuminates a same region from which said uplink beam originates, and wherein a power level of said corresponding one of said downlink beams is a function of a power level of said uplink beam.

2. A satellite payload as set forth in claim 1, wherein said first band of frequencies is within an L-band, wherein said second band of frequencies is within a C-band, and wherein said third band of frequencies is within an S-band.

3. A satellite payload as set forth in claim 1, wherein each of said n receive elements has a plurality of receive amplifiers coupled thereto.

4. A satellite payload as set forth in claim 3, wherein an input of each of said receive amplifiers is coupled into free space at one of said receive elements.

5. A satellite payload as set forth in claim 1, wherein an output of each of said power amplifiers is coupled into free space at one of said transmit elements.

6. A satellite communication system, comprising:
   a plurality of terrestrial-based user terminals for transceiving in first and second frequency bands at least voice communications using a Code Division Multiple Access (CDMA) technique;
   at least one terrestrial-based ground station for transceiving in a third frequency band at least voice communications using the CDMA technique; and
   at least one satellite repeater for relaying at least voice communications between said plurality of user terminals and said at least one ground station, said at least one satellite repeater having a communications payload comprised of:
   a phased array receiving antenna having n receive elements for receiving RF signals from user terminals within the first band of frequencies;
   first beam forming means having an input coupled to each of said n receive elements for forming m uplink beams from RF signals received by said phased array receiving antenna, wherein n is greater than one, and wherein m is less than n;
   ground station communication means, having an input coupled an output of said first beam forming means, for converting said m uplink beams into RF signals within said third band of frequencies and for transmitting RF signals to and for receiving RF signals from said at least one ground station, the transmitted and received RF signals being within said third band of frequencies;
   second beam forming means having an input coupled to an output of said ground station communication means for forming m downlink beams from the RF signals received from said ground station, said m downlink beams being formed within said second band of frequencies; and
   a phased array transmitting antenna having n transmit elements for transmitting said m downlink beams to user terminals as RF signals within said second band of frequencies, each of said transmit elements having a power amplifier means associated therewith, each of said power amplifier means having an input coupled to an output of said second beam forming means and an output coupled into free space via one of said transmit elements, wherein each of said n transmit elements transmits RF energy for each of said m downlink beams, wherein each of said m uplink beams has a corresponding downlink beam that illuminates a same terrestrial region from which said uplink beam originates, and wherein a power level of said corresponding one of said downlink beams is a function of user demand for said uplink beam.

7. A satellite payload for use with a communication system, the payload comprising:

a phased array receiving antenna having n receive elements for receiving m uplink beams comprised of RF signals within a first band of frequencies, wherein n is greater than one, and wherein m is less than n;

n power dividers each having an input coupled to an output of one of said n receive elements and m outputs;

m uplink beam forming means each having m inputs and one output, individual ones of said m inputs being coupled to one of said m outputs of each of said n power dividers;

m first frequency conversion means each of which has an input coupled to said output of one of said m beam forming means, each of said m first frequency conversion means having an output for providing an RF signal within a second band of frequencies;

means for combining said outputs of said m frequency conversion means and for transmitting an m-channel RF signal to a ground station, the transmitted RF signal being within said second band of frequencies;

means for receiving an m-channel RF signal from the ground station, the received RF signal being within said second band of frequencies;

m second frequency conversion means each of which has an input coupled to an output of said ground station receiving means, each of said m second frequency conversion means being responsive to one channel of the received m-channel RF signal and having an output for providing an RF signal within a third band of frequencies;

m downlink beam forming means each having an input coupled to an output of one of said m second frequency conversion means;

n power combiners each having m inputs for coupling to an output of said m downlink beam forming means and an output; and a phased array transmitting antenna having n transmitter elements for transmitting m beams comprised of RF signals within said third band of frequencies, each of said n transmitter elements being coupled to an output of one of said n power combiners, wherein each of said n transmitter elements transmits RF energy for each of said m downlink beams, wherein each of said n uplink beams has a corresponding downlink beam that illuminates a same region from which said uplink beam originates, and wherein a power level of said corresponding one of said downlink beams is a function of a power level of said uplink beam.

8. A satellite payload as set forth in claim 7, wherein said first band of frequencies is within an L-band, wherein said second band of frequencies is within a C-band, and wherein said third band of frequencies is within an S-band.

9. A satellite payload as set forth in claim 7, wherein each of said n receive elements has at least one receive amplifier coupled thereto, and wherein an input of each of said receive amplifiers is coupled into free space at one of said receive elements.

10. A satellite payload as set forth in claim 7, wherein each of said n transmitter elements has at least one transmit amplifier coupled thereto, and wherein an output of each of said transmit amplifiers is coupled into free space at one of said transmitter elements.

* * * * *